United States Patent Office 3,582,348
Patented June 1, 1971

3,582,348
SILVER HALIDE EMULSIONS CONTAINING MEROCYANINE DYES HAVING A TRIAZOLO OR TETRAZOLO (1,5-a) PYRIMIDIN-7(6H)-ONE NUCLEUS
Donald W. Heseltine and Carl H. Eldredge, Rochester, N.Y., assignors to Eastman Kodak Company, Rochester, N.Y.
No Drawing. Filed May 28, 1968, Ser. No. 732,543
Int. Cl. G03c *1/08, 1/28;* C09b *23/10*
U.S. Cl. 96—141                                 23 Claims

ABSTRACT OF THE DISCLOSURE

Merocyanine dyes are provided which feature a triazolo- or a tetrazolo (1,5-a) pyrimidin-7(6H)-one nucleus. Light sensitive photographic silver halide emulsions containing such dyes are also provided.

This invention relates to novel photographic materials, and more particularly to a new class of merocyanine dyes, to novel photographic silver halide emulsions containing these dyes, and to new photographic elements prepared with such emulsions.

A number of dyes have been proposed for use in fogged direct positive silver halide emulsions. The dyes function as electron acceptors and spectral sensitizers in such systems. As electron acceptors, they increase the speed of the emulsion. Prior art dyes which are efficient electron acceptors have tended, upon storage, to destroy fog in the direct positive emulsions. This results in an undesirable loss of density upon development. There is a need, therefore, for sensitizing dyes which are efficient electron acceptors, and which have a greatly reduced tendency to destroy fog in direct positive emulsions.

It is, accordingly, an object of this invention to provide a new class of merocyanine dyes that avoid the above mentioned disadvantages of prior art desensitizing dyes.

Another object of this invention is to provide novel photographic silver halide emulsions, such as fogged direct positive emulsions contatining one or more of the new merocyanine dyes of this invention.

Another object of this invention is to provide novel direct positive, photographic silver halide emulsions which exhibit good stability upon storage.

Another object of this invention is to provide novel photographic elements comprising a support having thereon at least one layer containing a novel emulsion of this invention.

Another object of this invention is to provide methods for the preparation of such novel dyes and photographic materials of this invention.

Other objects will be apparent from this disclosure and the appended claims.

We have now found that merocyanine dyes derived from triazolo- and tetrazolopyrimidinones are outstanding electron acceptors and spectral sensitizers for direct positive type photographic silver halide emulsions. They provide superior reversal systems, especially with fogged silver halide emulsions that are characterized by both good speed and desired selective sensitivity to radiation in the green to red region of the spectrum, with maximum sensitivity occurring in most cases in the region of about 520–555 mm. The images produced with these new direct positive photographic emulsions are clear and sharp, and of excellent contrast. All these new dyes are more efficient sensitizers than related dyes. The dyes of this invention cause less incubation and storage instability in direct positive silver halide emulsions than those sensitizing dyes suggested by the prior art which are efficient electron acceptors.

The new class of merocyanine dyes of this invention include those comprising first and second 5- to 6-membered nitrogen containing heterocyclic nuclei joined together by a dimethine linkage; the first of said nuclei being a triazolo(1,5-a) pyrimidin-7(6H)-one nucleus or a tetrazolo(1,5-a) pyrimidin-7(6H)-one nucleus, which first nucleus is joined at the 6-carbon atom thereof to said linkage; and, said second nucleus being a desensitizing nucleus of the type used in the production of cyanine dyes joined at a carbon atom thereof to said linkage to complete said dye.

The preferred merocyanine dyes of the invention that are especially useful as electron acceptors and spectral sensitizers for direct positive photographic silver halide emulsions are represented by the following general formula:

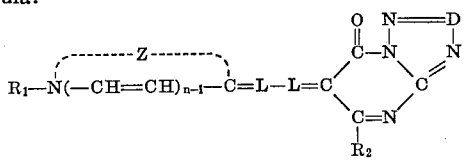

(I)

wherein $n$ represents a positive integer of from 1 to 2; L represents a methine linkage, e.g. —CH=, —C(CH$_3$)=, —C(C$_6$H$_5$)=, etc.; R$_1$ represents an alkyl group, including substituted alkyl, (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups, (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc. a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc., and the like; an alkenyl group, e.g., allyl, 1-propenyl, 2-butenyl, etc., or, an aryl group, e.g., phenyl tolyl, naphthyl, methoxyphenyl, chlorophenyl, etc.; R$_2$ represents an alkyl group, including substituted alkyl, (preferably a lower alkyl containing from 1 to 4 carbon atoms), e.g., methyl, ethyl, propyl, isopropyl, butyl, hexyl, cyclohexyl, decyl, dodecyl, etc. or an aralkyl group, e.g., benzyl, phenethyl, etc.; or an aryl group, e.g., phenyl, totyl, naphthyl, methoxyphenyl, chlorophenyl, etc.; D represents a nitrogen atom or a methine group such as —CH=, —C(CH$_3$)=, —C(C$_6$H$_5$)=, etc.; and Z represents the non-metallic atoms necessary to complete a heterocyclic nucleus of the type used in cyanine dyes, preferably a desensitizing nucleus, containing from 5 to 6 atoms in the heterocyclic ring, which nucleus may contain a second hetero atom such as oxygen, sulfur, selenium or nitrogen, such as used in cyanine dyes, and including the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4 - (2 - thienyl)thiazole, benzothiazole, 4 - chlorobenzothiazole, 4- or 5-nitrobenzothiazole, 5-chlorobenzothiazole, 6 - chlorobenzothiazole, 7 - chlorobenzothiazole, 4 - methylbenzothiazole, 5 - methylbenzothiazole, 6-methylbenzothiazole, 5 - nitrobenzothiazole, 6 - nitrobenzothiazole, 5 - bromobenzothiazole, 6-bromobenzothiazole, 5 - chloro - 6 - nitrobenzothiazole, 5-phenylbenzothiazole, 5 - phenylbenzothiazole, 4 - methoxybenzothiazole, 5 - methoxybenzothiazole, 6 - methoxybenzothiazole, 5 - iodobenzothiazole, 6 - iodobenzothiazole, 4 - ethoxybenzothiazole, 5 - ethoxybenzothiazole, tetrahydrobenzothiazole, 5,6 - dimethoxybenzothiazole, 5,6 - dioxymethylenebenzothiazole, 5 - hydroxybenzothiazole, 6 - hydroxybenzothiazole, naphtho [2,1-d]thiazole, naphtho [1,2-d]thiazole, naphtho [2,3-d]thiazole, 5-methoxynaphtho[2,3 - d]thiazole, 5 - ethoxynaphtho[1,2-d]thiazole, 8 - methoxynaphtho[2,1-d]thiazole, 7-methoxynaphtho[2,1-d]thiazole, 4' - methoxythianaphtheno - 7',6',4,5 - thiazole, nitro group substituted naphthothiazoles, etc.; an oxazole nucleus, e.g., 4 - methyloxazole, 4 - nitrooxazole, 5 - methyloxazole, 4-phenyloxazole, 4,5 - diphenyloxazole, 4 - ethyloxazole, 4,5-dimethyloxazole, 5 - phenyloxazole, benzoxazole, 5-chlorobenzoxazole, 5 - methylbenzoxazole, 5 - phenylbenzoxazole, 5- or 6 - nitrobenzoxazole, 5 - chloro-6-nitrobenzoxazole, 6 - methylbenzoxazole, 5,6 - dimethylbenzoxazole, 4,6 - dimethylbenzoxazole, 5 - methoxybenzoxazole, 5 - ethoxybenzoxazole, 5 - chlorobenzoxazole, 6 - methoxybenzoxazole, 5 - hydroxybenzoxazole, 6 - hydroxybenzoxazole, naphtho[2,1-d]oxazole, naphtho[1,2-d]oxazole, nitro group substituted naphthoxazoles, etc.; a selenazole nucleus, e.g., 4-methylselenazole, 4 - nitroselenazole, 4 - phenylselenazole, benzoselenazole, 5 - chlorobenzoselenazole, 5 - methoxybenzoselenazole, 5 - hydroxybenzoselenazole, 5- or 6-nitrobenzoselenazole, 5-chloro - 6 - nitrobenzoselenazole, tetrahydrobenzoselenazole, naphtho[2,1 - d]selenazole, naphtho[1,2-d]selenazole, nitro group substituted naphthoselenazoles, etc.; a thiazoline nucleus, e.g., thiazoline, 4 - methylthiazoline, 4 - nitrothiazoline, etc.; a pyridine nucleus, e.g., 2-pyridine, 5-methyl-2-pyridine, 4-pyridine, 3-methyl-4-pyridine, nitro group substituted pyridines, etc.; a quinoline nucleus, e.g., 2-quinoline, 3-methyl-2-quinoline, 5 - ethyl - 2 - quinoline, 6-chloro-2-quinoline, 6-nitro-2-quinoline, 8-chloro-2-quinoline, 6 - methoxy - 2-quinoline, 8-ethoxy-2-quinoline, 8-hydroxy-2-quinoline, 4-quinoline, 6 - methoxy-4-quinoline, 6 - nitro-4-quinoline, 7-methyl - 4 - quinoline, 8-chloro-4-quinoline, 1-isoquinoline, 6 - nitro - 1 - isoquinoline, 3,4-dihydro-1-isoquinoline, 3-isoquinoline, etc.; a 3,3 - dialkylindolenine nucleus, preferably having a nitro or cyano substituent, e.g., 3,3-dimethyl-5- or 6-nitroindolenine, 3,3-dimethyl-5- or 6-cyanoindolenine, etc.; and, an imidazole nucleus, e.g., imidazole, 1-alkllimidazole, 1 - alkyl - 4 - phenylimidazole, 1-alkyl-4,5-dimethylimidazole, benzimidazole, 1 - alkylbenzimidazole, 1 - aryl-5,6-dichlorobenzimidazole, 1 - alkyl-1H-naph[1,2-d]imidazole, 1 - aryl-3H-naphth[1,2-d]imidazole, 1 - alkyl - 5 - methoxy-1H-naphth[2,1-d]imidazole, etc., an imidazo[4,5-b]quinoxaline nucleus, e.g., a 1,3 - dialkylimidazo[4,5-b]quinoxaline such as 1,3-diethylimidazo[4,5-b]quinoxaline, 6-chloro - 1,3 - diethylimidazo[4,5-b]quinoxaline, etc., a 1,3 - dialkenylimidazo[4,5-b]quinoxaline such as 1,3-diallylimidazo[4,5-b]quinoxaline, 6 - chloro-1,3-diallylimidazo[4,5-b]quinoxaline, etc., a 1,3 - diarylimidazo [4,5-b]quinoxaline such as 1,3-diphenylimidazo[4,5-b] quinoxaline, 6 - chloro - 1,3 - diphenylimidazo[4,5-b] quinoxaline, etc.; a 3,3 - dialkyl - 3H - pyrrolo[2,3-b] pyridine nucleus, e.g., 3,3 - dimethyl-3H-pyrrolo[2,3-b] pyridine, 3,3 - diethyl - 3H - pyrrolo[2,3-b]pyridine, etc.; a thiazole[4,5-b]quinoline nucleus; and the like. The nuclei wherein Z in above Formula I represents the atoms necessary to complete a desensitizing nucleus such as a nitro group substituted thiazole, oxazole, selenazole, thiazoline, pyridine, quinoline, 3,3-dialkylindolenine or imidazole nucleus; or a 3,3-dialkyl-3H-pyrrolo[2,3-b]pyridine nucleus and the like; provide particularly efficacious spectral sensitizers and electron acceptors for the direct positive emulsions and elements of this invention. Dyes containing such desensitizing nuclei, and more particularly those wherein the said first nucleus is a triazolo[1,5-a] pyrimidin - 7 - (6H) - one nucleus, are the preferred dye species herein. Representative useful dyes are listed below:

6-[(1,3-diallylimidazo[4,5-b]quinoaxalin-2(3H)-ylidene)ethylidene]-5-methyl-s-triazolo[1,5-a] pyrimidin-7-(6H)-one 5-methyl-6-[(1,3,3-trimethyl-5-nitro-2(3H)indolinylidene)ethylidene]-s-triazolo[1,5-a] pyrimidin-7(6H)-one 6-[(3-ethyl-6-nitro-2-benzothiazolinylidene)ethylidene] 5-methyl-s-triazolo[1,5-a]pyrimidin-7(6H)-one 5-methyl-6-[(1,3,3-trimethyl-1(H)-pyrrolo[2,3-b]pyridin-2-(3H)-ylidene)ethylidene]-s-triazolo[1,5-a] pyrimidin-7(6H)-one 6-[(3-ethyl-6-nitro-2-benzothiazolinylidene)ethylidene] 5-methyl-s-triazolo[1,5-a]pyrimidin-7(6H)-one 6-[(6-chloro-1,3-diphenylimidazo[4,5-b]quinoxolin-2-(3H)ylidene)ethylidene]-5-methyltetrazolo[1,5-a] pyrimidin-7(6H)-one 6-[(6-chloro-1,3-diphenylimidazo[4,5-b]quinoxolin-2-(3H)-ylidene)ethylidene]-5-methyl-s-triazolo[1,5-a]-pyrimidin-7(6H)-one 6-[(1-ethylnaphtho[1,2-d]thiazolin-2-ylidene)ethylidene]-5-methyl-s-triazolo[1,5-a]pyrimidin-7(6H)-one 6-[(1,3-diethylimidazo[4,5-b]quinoxolin-2(3H)-ylidene) ethylidene]-5-methyltetrazolo[1,5-a]pyrimidin-7(6H)-one 5-methyl-6-[1,3,3-trimethyl-5-nitro-2(3H)-indolinylidene) ethylidene]tetrazolo[1,5-a]pyrimidin-7(6H)-one 5-methyl-6-[(1,3,3-trimethyl-1H-pyrrolo[2,3-b]pyridin-2(3H)-ylidene)ethylidene]tetrazolo[1,5-a]pyrimidin-7(6H)-one 6-[(3-ethyl-6-nitro-2-benzoxazolinylidene)ethylidene]-5-methyl-s-triazolo[1,5-a]pyrimidin-7(6H)-one 6-[(3-ethyl-6-nitro-2-benzoselenazolinylidene)ethylidene]-5-methyl-s-triazolo[1,5-a]pyrimidin-7(6H)-one 6-[(3-ethyl-6-nitro-2-benzothiazolinylidene)ethylidene-5-phenyl-s-triazolo[1,5-a]pyrimidin-7(6H)-one 5-butyl-6-[(1-methyl-6-nitro-4-quinolinylidene)-ethylidene]-s-triazolo[1,5-a]pyrimidin-7(6H)-one The merocyanine dyes of the invention defined above are powerful electron acceptors for direct positive photographic silver halide emulsions. In addition, they are also useful desensitizers in emulsions used in the process described in Stewart and Reeves, U.S. Pat. No. 3,250,618, issued May 10, 1966.

As used herein and in the appended claims, "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 gram dye per mole of silver, cause by electron trapping at least about an 80 percent loss in the blue speed of the emulsion when sensitometrically exposed and developed three minutes in Kodak developer D–19 at 20° C., the composition of which is well known. Preferably, the electron-accepting nuclei are those which, when converted to a symmetrical carbocyanine dye and tested as just described above, essentially completely desensitize the test emulsion to blue radiation. Substantially complete desensitization as used herein, results in at least a 90 percent, and preferably a 95 percent loss of speed to blue radiation.

The merocyanine dyes of Formula I are prepared conveniently by heating a mixture of (1) a heterocyclic compound of the formula:

(II)

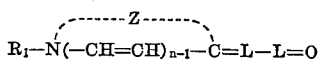

and (2) a pyrimidinone of the formula:

(III)

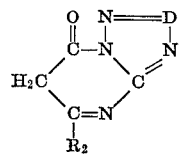

wherein N, L, $R_1$, $R_2$, D and Z are as previously defined in approximately equimolar proportions, in a solvent such as acetic anhydride, and if desired, in the presence of a condensing agent such as a trialkylamine, e.g., triethylamine, etc., piperidine, N-methylpiperidine, etc. The crude dyes are then separated from the chilled reaction mixtures and purified by one or more recrystallizations from appropriate solvents.

The intermediates represented by Formulas II and III above are well known to the art. For example, those of Formula III can be readily prepared by the methods described in N. Heimbach et al., U.S. Pat. No. 2,444,065, issued July 6, 1948; N. Heimbach, U.S. Pat. 2,450,397, issued Sept. 28, 1948; or as described by C. F. H. Allen et al., J. Org. Chem. 24, 779–796 (1959).

In accordance with the invention, novel and improved direct positive photographic silver halide emulsions are prepared by incorporating one or more of the merocyanine dyes of the invention into a suitable fogged silver halide emulsion. The emulsion can be fogged in any suitable manner, such as by light or with chemical fogging agents, e.g., stannous chloride, formaldehyde, thiourea dioxide, and the like. The emulsion may be fogged by the addition thereto of a reducing agent, such as thiourea dioxide, and a compound of a metal more electropositive than silver, such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about .05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK–50 having the composition set forth below, when the emulsion is coated at a silver coverage of 50 mg. to 500 mg. per square foot.

DEVELOPER

| | G. |
|---|---|
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |

Water to make 1.0 l.

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. patent application Ser. No. 448,467, filed Apr. 15, 1965, now U.S. Pat. 3,367,778 issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface-fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

| | G. |
|---|---|
| N-methyl-p-aminophenol sulfate | 2.5 |
| Ascorbic acid | 10.0 |
| Potassium metaborate | 35.0 |
| Potassium bromide | 1.0 |

Water to 1 liter.
pH of 9.6.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Sauvenier in Science et Industries Photographiques, vol. XXVIII, January 1957, pages 1 to 23 and January 1957, pages 57 to 65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The dyes of this invention are highly useful electron acceptors in high speed direct positive emulsions comprising fogged silver halide grains and a compound which accepts electrons, as described and claimed in Illingsworth U.S. patent application Ser. No. 619,936, filed Mar. 2, 1967, now U.S. Pat. 3,501,307 issued Mar. 17, 1970. The fogged silver halide grains of such emulsions are such that a test portion thereof, when coated as a photographic silver halide emulsion on a support to give a maximum density of at least about one upon processing for six minutes at about 68° F. in Kodak DK–50 developer, has a maximum density which is at least about 30% greater than the maximum density of an identical coated test portion which is processed for six minutes at about 68° F. in Kodak DK–50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter.

The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating with an identical coating which is processed for six minutes at 69° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromoiodide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. patent application Ser. No. 619,909, filed Mar. 2, 1967, now U.S. Pat. 3,501,306 issued Mar. 17, 1970. Such grains advantageously have a rather uniform diameter frequency distribution, as described and claimed in Illingsworth U.S. patent application Ser. No. 619,948, filed Mar. 2, 1967, now U.S. Pat. 3,501,305 issued Mar 17, 1970. For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photograph Journal, vol. LXXIX, 1949, pages 330–338. The fogged silver halide grains in these direct-positive photographis emulsions of this invention produce a density of at least 0.5 when developed without exposure for five minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

In the preparation of the above photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions than can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pats. 3,142,568; 3,193,386; 3,062,674 and 3,220,844 and include the water insoluble polymers of alkyl acrylates and methacrylates, acrylic acid, sulfoalkyl acrylates or methacrylates and the like.

The dyes, reducing agents and metal compounds of the invention can be used with emulsions prepared, as indicated above, with any of the light-sensitive silver halide salts including silver chloride, silver bromide, silver bromoiodide, silver chlorobromoiodide, etc. Particularly useful are direct positive fogged emulsions in which the silver salt is a silver bromohalide comprising more than 50 mole percent bromide. Certain dyes of this invention are also useful in emulsion which contain color formers.

The novel emulsions of this invention may be coated on any suitable photographic support, such as glass, film base such as cellulose acetate, cellulose acetate butyrate, polyesters such as poly(ethylene terephthalate), paper baryta coated paper, polyolefin coated paper, e.g., polyethylene or polypropylene coated paper, which may be electron bombarded to promote emulsion adhesion, to produce the novel photographic elements of the invention.

The invention is further illustrated by the following examples:

EXAMPLE 1

6 - [(1,3 - diallylimidazo[4,5-b]quinoxalin - 2(3H) - ylidene) - ethylidene] - 5 - methyl - s - triazolo[1,5-a]pyrimidin-7(6H)-one

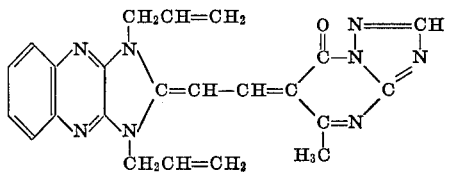

5 - methyl - s - triazolo[1,5-a]pyrimimidin - 7(6H)-one (1 mol., 1.5 g.) and 1,3-diallyl - 2 - formylmethylene-1,2 - dihydroimidazo[4,5-b]quinoxaline (1 mol., 2.9 g.) are mixed in acetic anhydride (50 ml.) and the mixture heated under reflux for five minutes. The reaction mixture is chilled, crystalline dye is collected on a filter funnel, washed with either, and dried. After twice precipitating from m-cresol with methyl alcohol and extracting twice with hot N,N-dimethylacetamide, the yield of pure dye is 0.8 g. (19%), M.P. 271–272° C., dec.

The above prepared dye containing the desensitizing 1,3-diallylimidazo[4,4 - b]quinoxaline nucleus is photographically tested for its usefulness as an electron acceptor and spectral sensitizer for fogged direct positive photographic silver halide emulsions by the following procedure.

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner. The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The dye of the above example, 6 - [(1,3 - diallylimidazo[4,5-b]quinoxalin - 2(3H)-ylidene)ethylidene] - 5 - methyl - s - triazolo [1,5-a]pyrimidin-7(6H)-one is then added to the above fogged emulsion in amount sufficient to give the concentration recorded in Table I hereinafter of the dye per mole of silver. The resulting emulsion is coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D-19 developer which has the following composition:

| | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | |

The sample is then fixed, washed and dried. The results are listed in Table I hereinafter. Referring thereto, it will be seen that the dye of this example has a maximum density in the unexposed areas of 1.57 and a minimum density in exposed areas of .07, a maximum sensitivity of 540 nm. and a relative speed of 1200. In contrast, the control containing no dye shows a speed of less than 1, and exhibits no reversal. The dye sample also shows excellent incubation stability. These results indicate that the dye compound of the above example is an outstanding electron acceptor and spectral sensitizer for fogged direct positive silver halide emulsions. It thus provides improved high quality direct positive photographic silver halide emulsions. Excellent magenta images are obtained when the color former 1 - (2,4,6 - trichlorophenyl) - 3,3' - (2",4"-di-t-pentylphenoxyacetamido)benzamido - 5 - pyrazolone is incorporated in the emulsion of this example, the emulsion is coated on a support, exposed to a tungsten source through Wratten filter No. 61 and No. 16, and reversal processed as described in Graham et al. U.S. Pat. 3,046,-129, issued July 24, 1962, in Example (a) col. 27, lines 27 et seq. except that black-and-white (MQ) development is omitted, the color development is reduced to one minute and is conducted in total darkness until after fixing.

EXAMPLE 2

5 - methyl - 6 - [(1,3,3 - trimethyl - 5 - nitro - 2(3H) indolinylidene)ethylidene]-s-triazolo[1,5 - a]pyrimidin-7(6H)-one

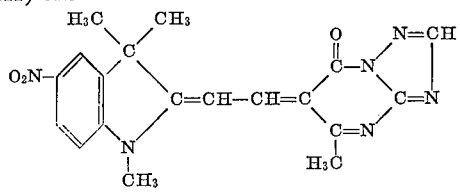

5-methyl - s - triazolo[1,5-a]pyrimidin-7(6H) - one (1 mol., 1.5 g.) and 2-formylmethylene-1,3,3-trimethyl-5-nitroindoline (1 mol., 2.5 g.) are mixed in acetic anhydride (50 ml.), triethylamine (1.4 ml.) added, and the mixture is heated under reflux for ten minutes. The reaction mixture is chilled, crystalline dye is collected on a filter funnel, washed with ether, and dried. After twice precipitating from m-cresol with methyl alcohol and extracting once with hot N,N-dimethylacetamide, the yield of pure dye is 0.5 g. (13%), M.P. 278° C., dec.

The above prepared dye containing the desensitizing 1,3,3-trimethyl-5-nitro-3H-indole nucleus is tested by the exact procedure described in above Example 1. The results in Table 1 hereinafter show densities of 1.46 and .05 in the unexposed and exposed areas, respectively, with maximum sensitivity at 550 nm. and a relative speed of 1100, thereby indicating the dye of the above example is an outstanding electron acceptor and spectral sensitizer for fogged direct positive photographic emulsions. Excellent incubation and keeping stability is shown.

EXAMPLE 3

6-[(3-ethyl-6-nitro-2-benzothiazolinylidene)ethylidene] 5-methyl-s-triazolo[1,5-a]pyrimidin-7(6H)-one

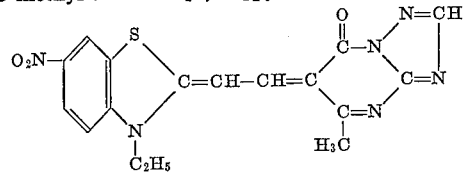

5-methyl-s-triazolo[1,5-a]pyrimidin-7(6H)-one (1 mol., 1.5 g.) and 3-ethyl-2-formylmethylene-6-nitrobenzothiazoline (1 mol., 2.5 g.) are mixed in acetic anhydride (50 ml.), triethylamine (1.4 ml.) added, and the mixture is heated under reflux for one minute. The reaction mixture is filtered while still hot. The crystalline dye that is collected on a filter funnel is washed with acetone and dried. After one extraction with hot N,N-dimethylacetamide, the yield of pure dye is 1.1 g. (29%), M.P. 287° C., dec.

The photographic testing of the above prepared dye containing the desensitizing 3-ethyl-6-nitro-2-benzothiazole nucleus is carried out by the exact procedure described in above Example 1. The results, as shown in Table 1 hereinafter, of maximum densities of 1.52 and .10 in the unexposed and exposed areas, respectively, with maximum sensitivity at 535 nm. and a relative speed of 631, indicate that the dye of the above example is an excellent electron acceptor and spectral sensitizer for fogged photographic reversal emulsions. This dye indicates excellent incubation and keeping stability.

In place of the 3-ethyl-2-formylmethylene-6-nitro-thiazoline in the above example, there can be substituted for an equivalent amount of related intermediates, for example, 3-ethyl-2-formylmethylene-6-nitrobenzoxazoline to give the dye 6-[(3-ethyl-6-nitro-2-benzoxazolinylidene) ethylidene]-5-methyl-s-triazolo[1,5 - a]pyrimidin - 7(6H)-one; or 3-ethyl-2-formylmethylene - 6 - nitrobenzoselenazoline to obtain the dye 6[(3-ethyl-6-nitro-2-benzoselenazolinylidene)ethylidene]-5-methyl-s-triazolo[1,5 - a] pyrimidin-7(6H)-one; etc. It will be apparent also that the 3-ethyl group substituent in the above-named dyes can be replaced with any other of those defined hereinbefore under $R_1$, for example, 3-methyl-, 3-propyl, 3-butyl, etc., to give the corresponding dye compounds in accordance with above Example 3.

EXAMPLE 4

5-methyl-6-[1,3,3 - trimethyl-1(H)-pyrrolo[2,3-b]pyridin-2-(3H)ylidene)ethylidene]-s-triazolo[1,5 - a]pyrimidin-7(6H)-one

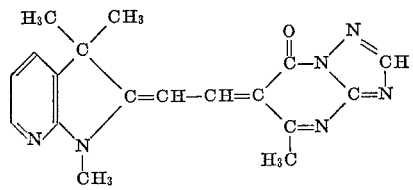

5-methyl-s-triazolo[1,5-a]pyrimidin-7(6H)-one (1 mol., .75 g.) and 2-formylmethylene-2,3-dihydro-1,3,3-trimethyl-1(H)-pyrrolo[2,3-b]pyridine (1 mol., 1.0 g.) are mixed in acetic anhydride (15 ml.) and heated under reflux for ten minutes. The reaction mixture is chilled, crystalline dye collected on a filter funnel, washed with acetone, and dried. After two recrystallizations from N,N-dimethylacetamide, the yield of pure dye is 0.4 g. (24%), M.P. 257.5–258° C., dec.

The photographic testing of the above prepared dye containing the 1,3,3-trimethyl-1(H)-pyrrolo[2,3-b]pyridine nucleus is carried out by the exact procedure described in above Example 1. The results, as shown in Table 1 hereinafter, of maximum densities of 1.50 and .09 in the unexposed and exposed areas, respectively, with maximum sensitivity at 520 nm. and a relative speed of 700, indicate that the dye of the above example is an exceptionally useful electron acceptor and spectral sensitizer for fogged photographic reversal emulsions. Good incubation and keeping stability is also shown.

EXAMPLE 5

6-[(3-ethyl-6-nitro-2-benzothiazolinylidene)ethylidene] 5-methyltetrazolo[1,5-a]pyrimidin-7(6H)-one

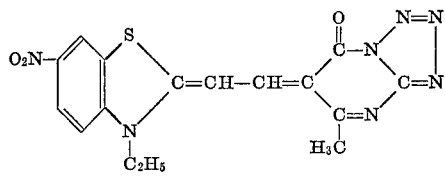

5-methyltetrazolo[1,5-a]pyrimidin-7(6H)-one (1 mol., 1.5 g.) and 3-ethyl-2-formylmethylene-6-nitrobenzothiazoline (1 mol., 2.5 g.) are mixed in acetic anhydride (50 ml.) triethylamine (1.4 ml.) added, and the mixture is heated under reflux for three minutes. The reaction mixture is filtered while still hot. The crystalline dye that is collected on a filter funnel is washed with acetone and dried. After extracting once with hot N,N-dimethylacetamide and precipitating once from m-cresol with methyl alcohol, the yield of pure dye is 0.4 g. (10%), M.P. 265° C., dec.

The photographic testing of the above prepared dye containing the desensitizing 3-ethyl-6-nitro-2-benzothiazole nucleus is carried out by the exact procedure described in above Example 1. The results, as shown in Table 1 hereinafter, of maximum densities of 1.44 and .09 in the unexposed and exposed areas, respectively, with maximum sensitivity at 535 nm. and a relative speed of 603, indicate that the dye of the above example is an excellent electron acceptor and spectral sensitizer for fogged photographic reversal emulsions. Excellent incubation and keeping stability is also shown.

EXAMPLE 6

6-[(6 - chloro - 1,3 - diphenylimidazo[4,5-b]quinoxolin-2 - (3H)ylidene]ethylidene]-5-methyltetrazolo[1,5-a]-pyrimidin-7-(6H)-one

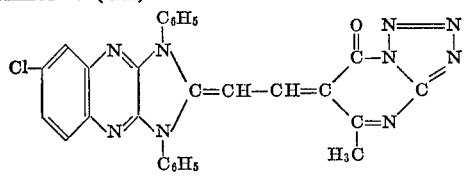

5-methyltetrazolo[1,5-a]pyrimidin-7(6H)-one (1 mol., 0.9 g.) and 6-chloro-2-formylmethylene-1,3-diphenyl-1,2-dihydroimidazo[4,5-b]quinoxoline (1 mol., 2.3 g.) are mixed in acetic anhydride (20 ml.) and heated under reflux for two minutes. The reaction mixture is chilled, crystalline dye collected on a filter funnel, washed with acetone, and dried. After two recrystallizations, from N,N-dimethylacetamide, the yield of pure dye is 0.7 g. (23%), M.P. 296–297° C., dec.

This dye containing the desensitizing 1,3 - diphenylimidazo[4,5-b]quinoxaline nucleus is tested by the exact procedure of the above Example 1 and found, as shown in Table 1 hereafter, to be an excellent electron acceptor and spectral sensitizer for fogged direct positive photographic emulsions. The densities are shown to be 1.66 and .08 for the unexposed and exposed areas, respectively, with a maximum sensitivity at 535 nm. and a relative speed of 331. Excellent incubation and keeping stability is also shown.

EXAMPLE 7

6-[6 - chloro - 1,3 - diphenylimidazo[4,5-b]quinoxolin-2-(3H)-ylidene)ethylidene] - 5 - methyl - s - triazolo-[1,5-a]-pyrimidin-7(6H)-one

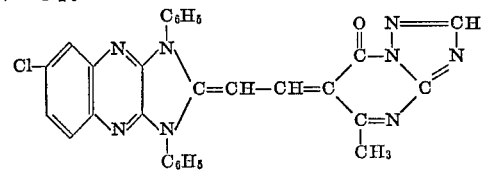

5-methyl-s-triazolo[1,5-a]pyrimidin-7(6H)-one (1 mol., 1.0 g.) and 6-chloro-2-formylmethylene-1,3-diphenyl-1,2-dihydroimidazo[4,5-b]quinoxoline (1 mol., 2.7 g.) are mixed in acetic anhydride (50 ml.) and heated under reflux for eight minutes. The reaction mixture is cooled, crystalline dye collected on a filter funnel, washed with acetone and dried. After twice precipitating from m-cresol with methyl alcohol, the yield of pure dye is 2.2 g. (61%), M.P. 297° C., dec.

This dye containing the desensitizing 1,3-diphenylimidazo[4,5-b]quinoxaline nucleus is tested by the exact procedure of above Example 1 and found, as shown in Table 1 hereinafter, to be an outstanding electron acceptor and spectral sensitizer for fogged direct positive photographic emulsions. The densities are shown to be 1.43 and .07 for the unexposed areas, respectively, with a maximum sensitivity at 555 nm. and a relative speed of 1820. The incubation and keeping stability is also excellent.

EXAMPLE 8

6 - [(1 - ethylnaphtho[1,2-d]thiazolin-2-ylidene)-ethylidene] - 5 - methyl - s - triazolo[1,5-a]pyrimidin-7(6H)-one

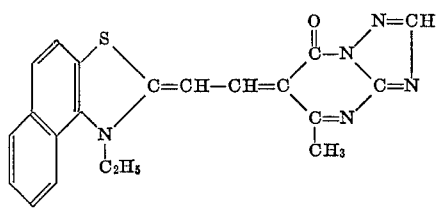

Phosphoryl chloride (1.1 m., 2.0 ml.) is added, with cooling, to N,N-dimethylformamide (20 ml.). 5-methyl-s-triazolo[1,5-a]pyrimidin-7(6H)-one (1 mol., 3.0 g.) is then added and the mixture is heated on a steam bath until a solution is effected. The reaction mixture is cooled, and 1-ethyl-2-methylnaphtho[1,2-d] thiazolium p-toluenesulfonate (1 mol., 8.0 g.) and pyridine (50 ml.) are added. This reaction mixture is heated on a steam bath for twenty minutes and then filtered hot. The crystalline dye that is collected on a filter funnel is washed with methyl alcohol and dried. After one recrystallization from N,N-dimethylacetamide and once precipitating from m-cresol with methyl alcohol, the yield of pure dye is .51 g. (7%), M.P. 246–247° C., dec.

The above prepared dye containing the 1-ethylnaphtho-[1,2-d]thiazole nucleus is tested by the procedure described in above Example 1. The results are shown in Table 1 hereinafter. Referring thereto, it will be seen that the densities are 1.30 and .12 for the unexposed and exposed areas, respectively, with a maximum sensitivity at 520 nm. and a relative speed of 229. Thus, this dye is a very useful electron acceptor and spectral sensitizer for fogged direct positive silver halide emulsions. Good incubation stability is also shown.

EXAMPLE 9

6 - [(1,3 - diethylimidazo[4,5 - b]quinoxolin-2(3H)-ylidene)ethylidene] - 5 - methyltetrazolo[1,5-a]pyrimidin-7(6H)-one

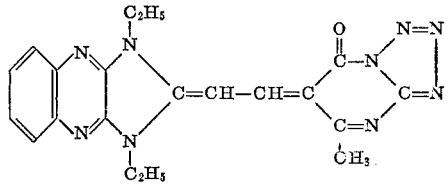

5-methyltetrazolo[1,5-a]pyrimidin-7(6H)-one (1 mol., 3.0 g.) and 1,3-diethyl-2-formylmethylene-1,2-dihydro-imidazo-[4,5-b]quinoxaline (1 mol., 5.4 g.) are mixed in acetic anhydride (50 ml.) and heated under reflux for one minute. The reaction mixture is chilled, crystalline dye was collected on a filter funnel, washed with acetone, and dried. After twice precipitating from m-cresol with methyl alcohol, the yield of pure dye is .5 g. (6%), M.P. 277° C., dec.

This dye containing the desensitizing 1,3-diethylimidazo[4,5-b]quinoxaline nucleus is tested by the exact procedure of above Example 1 and found, as shown in Table 1 hereinafter, to be a very useful electron acceptor and spectral sensitizer for fogged direct positive photographic emulsions. The densities are shown to be 1.44 and .14 for the unexposed and exposed areas, respectively, with a maximum sensitivity at 540 nm. and a relative speed of 219. Excellent stability is also shown.

EXAMPLE 10

5 - methyl - 6 - [(1,3,3 - trimethyl-5-nitro-2(3H)-indolinylidene)ethylidene]tetrazolo[1,5 - a]pyrimidin-7(6H)-one

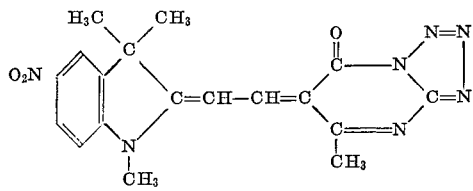

5-methyltetrazolo[1,5-a]pyrimidin-7(6H)-one (1 mol., 3.0 g.) and 2 - formylmethylene-1,3,3-trimethyl-5-nitro-indoline (1 mol., 4.9 g.) are mixed in acetic anhydride (50 ml.) and heated under reflux for two minutes. The reaction mixture is chilled, the crystalline dye collected on a filter funnel, washed with acetone, and dried. After twice precipitating from m-cresol with methyl alcohol, the yield of pure dye is 3.3 g. (43%), M.P. >300° C.

This dye containing the desensitizing 1,3,3-trimethyl-5-nitro-3H-indole nucleus is tested in accordance with the test procedure of above Example 1. The results are recorded in Table 1 hereinafter. Referring to the table, it will be seen that the densities are 1.45 and .06 for the unexposed and exposed areas, respectively, with maximum sensitivity at 550 nm. and a relative speed of 661. This dye is accordingly, an excellent electron acceptor and spectral sensitizer for the fogged direct positive emulsions and elements of this invention. The incubation and keeping stability is also excellent.

EXAMPLE 11

5-methyl-6-[1,3,3-trimethyl-1H-pyrrolo[2,3-b]pyridin-2(3H)ylidene)ethylidene]tetrazolo[1,5-a]pyrimidin-7-(6H)-one

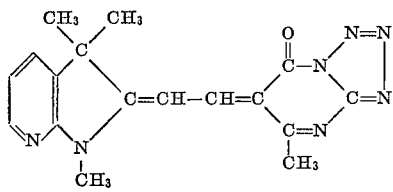

5 - methyltetrazolo[1,5-a]pyrimidin-7(6H-one (1 mol., .75 g.) and 2-formylmethylene-2,3-dihydro-1,3,3-trimethyl-1(H)-pyrrolo[2,3,b-]pyridine (1 mol., 1.0 g.) were mixed in acetic anhydride (15 ml.) and heated under reflux for ten minutes. The reaction mixture was chilled, crystalline dye collected on a filter funnel, washed with acetone, and dried. After two recrystallizations from N,N-dimetrylacetamide, the yield of pure dye was .3 g. (18%), M.P.>320° C.

This dye containing the desensitizing 1,3,3-trimethyl-3H-pyrrolo[2,3,b-]pyridine nucleus is tested in accordance with the test procedure of Example 1. The results of the test are recorded in Table 1 hereinafter. The densities are 1.65 and .07 for the unexposed and exposed areas, respectively, with maximum sensitivity at 535 nm. and a relative speed of 1050. Accordingly, this dye is an outstanding electron acceptor and spectral sensitizer for fogged direct positive photographic emulsions. Excellent incubation and storage or keeping stability is also shown.

The effectiveness of the new merocyanine dyes of the invention as electron acceptors and spectral sensitizers, as indicated by the testing procedure described in above Example 1, is summarized in the following table.

TABLE 1

| Dye of Ex. No. | Conc. dye, g./ mole silver | Relative clear speed | Density Max. unexposed areas | Density Min. exposed areas | Maximum sensitivity (nm.) |
|---|---|---|---|---|---|
| Control | None | >1 | 1.90 | No | Reversal |
| 1 | .500 | 1,200 | 1.57 | .07 | 540 |
| 2 | .300 | 1,100 | 1.46 | .05 | 550 |
| 3 | .500 | 631 | 1.52 | .10 | 535 |
| 4 | .700 | 661 | 1.50 | .09 | 520 |
| 5 | .500 | 603 | 1.44 | .09 | 535 |
| 6 | .300 | 331 | 1.66 | 08 | 535 |
| 7 | .500 | 1,820 | 1.43 | .07 | 555 |
| 8 | .300 | 229 | 1.30 | .12 | 520 |
| 9 | .650 | 219 | 1.44 | .14 | 540 |
| 10 | .400 | 661 | 1.45 | .06 | 550 |
| 11 | .700 | 1,050 | 1.65 | .07 | 535 |

The following examples further illustrate the preparation of fogged, direct positive photographic emulsions and elements with the merocyanine dyes of the invention.

EXAMPLE 12

To 9.0 pounds of a silver chloride gelatin emulsion containing an equivalent of 100 grams of silver nitrate is added 0.017 gram of the dye of above Example 1. The emulsion is coated on a non-glossy paper support, and is flashed with white light to give a density of 1.2 when developed in the following developer:

|   | Grams |
|---|---|
| N-methyl-p-aminophenol sulfate | 3.1 |
| Sodium sulfiite, des. | 45 |
| Hydroquinone | 12 |
| Sodium carbonate, des. | 67.5 |
| Potassium bromide | 1.9 |
| Water to 1 liter. |   |

The light fogged material can be exposed to an image with light modulated by a Wratten No. 15 filter to give a direct positive image. Generally similar results are obtained when the dyes of Examples 2, 7 and 11 are used in place of the above dye.

EXAMPLE 13

Seven pounds of a silver chloride gelatin emulsion containing the equivalent of 100 g. of silver nitrate is heated to 40° C. and the pH is adjusted to 7.8. Eight cc. of full strength (40%) formalin solution is added and the emulsion is held at 40° C. for 10 minutes. At the end of the holding period, the pH is adjusted to 6.0 and 0.125 g. of the dye of Example 3 is added. The emulsion is coated on a support, and provides good direct positive images. Similar results are obtained when the dye of Examples 4, 5 and 10 are substituted for the above dye.

By substituting other dye compounds of the invention, as defined in Formula I above, into the procedure of the above examples, similar fogged, direct positive photographic silver halide emulsions and photographic elements may be prepared.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al. U.S. Pat. 2,322,027, issued June 15, 1943, Fierke et al. U.S. Pat. 2,801,171, issued July 30, 1957, Fisher U.S. Pat. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

We claim:
1. A photographic silver halide emulsion containing a cyanine dye selected from those represented by the following general formula:

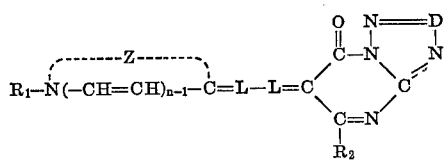

wherein $n$ represents a positive integer of from 1 to 2; L represents a methine linkage, $R_1$ represents a member selected from the group consisting of an alkyl group, an alkenyl group and an aryl group; $R_2$ represents a member selected from the group consisting of an alkyl group and an aryl group; D represents a member selected from the group consisting of a nitrogen atom and a methine group; and Z represents the non-metallic atoms necessary to complete a nucleus containing 5 to 6 atoms in the heterocyclic ring.

2. A photographic silver halide emulsion containing a merocyanine dye comprising first and second 5- to 6-membered nitrogen containing heterocyclic nuclei joined by a dimethine linkage; the first of said nuclei being selected from the group consisting of a triazolo[1,5-a]pyrimidin-7(6H)-one nucleus and a tetrazolo[1,5-a]pyrimidin-7(6H)-one nucleus, said first nucleus being joined at the 6-carbon atom thereof to said linkage.

3. A fogged direct positive photographic silver halide emulsion containing a merocyanine dye comprising first and second 5- to 6-membered nitrogen containing heterocyclic nuclei joined by a dimethine linkage; the first of said nuclei being selected from the group consisting of a triazolo[1,5-a]pyrimidin-7(6H)-one nucleus, a tetrazolo[1,5-a]pyrimidin-7(6H)-one nucleus, said first nucleus being joined at the 6-carbon atom thereof to said linkage.

4. A direct positive emulsion as defined in claim 3 wherein said second nucleus of said dye is a desensitizing nucleus.

5. A direct positive emulsion, as defined in claim 4 wherein said desensitizing nucleus is a nitro substituted desensitizing nucleus.

6. A direct positive emulsion as defined by claim 4 wherein said desensitizing nucleus is an imidazo[4,5-b]quinoxaline nucleus.

7. A direct positive emulsion as defined in claim 4 wherein said desensitizing nucleus is a 3,3-dialkyl-3(H)-pyrrolo[2,3-b]pyridine desensitizing nucleus.

8. A direct positive emulsion as defined in accordance with claim 3 containing a photographic color coupler.

9. A direct positive, photographic emulsion in accordance with claim 3 which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

potassium cyanide—50 mg.
acetic acid (glacial)—3.47 cc.
sodium acetate—11.49 g.
potassium bromide—119 mg.
water to 1 liter.

10. A direct positive, photographic emulsion in accordance with claim 3 which comprises fogged silver halide grains, at least 95%, by weight, of said grains having a size which is within about 40% of the average grain size.

11. A fogged direct positive, photographic silver halide emulsion containing at least one cyanine dye selected from those represented by the following general formula:

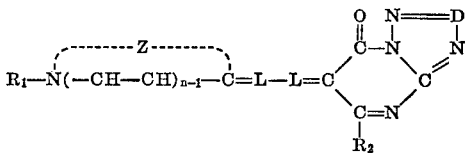

wherein $n$ represents a positive integer of from 1 to 2; L represents a methine linkage, $R_1$ represents a member selected from the group consisting of an alkyl group, an alkenyl group and an aryl group; $R_2$ represents a member selected from the group consisting of an alkyl group and an aryl group; D represents a member selected from the group consisting of a nitrogen atom and a methine group; and Z represents the non-metallic atoms necessary to complete a nucleus containing 5 to 6 atoms in the heterocyclic ring.

12. A direct positive emulsion as defined in claim 11 wherein said Z of said dye represents the non-metallic atoms required to complete a desensitizing nucleus.

13. A direct positive emulsion as defined in claim 11 wherein said Z represents the non-metallic atoms required to complete a nucleus selected from the group consisting of a nitrobenzothiazole nucleus; a nitrobenzoxazole nucleus; a nitrobenzo-selenazole nucleus; an imidazo[4,5-b]quinoxaline nucleus; and a 3,3-dialkyl-3(H)-pyrrolo[2,3-b]pyridine nucleus.

14. A direct positive emulsion as defined in claim 11 in which the said silver halide is present in the form of chemically fogged silver halide grains.

15. A direct positive emulsion as defined in claim 11 in which the said silver halide is present in the form of reduction and gold fogged silver halide grains.

16. A direct positive emulsion as defined in claim 11 containing a photographic color coupler.

17. A direct positive photographic emulsion as defined in accordance with claim 11 which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

potassium cyanide—50 mg.
acetic acid (glacial)—3.47 cc.
sodium acetate—11.49 cc.
potassium bromide—119 mg.
water to 1 liter.

18. A direct positive photographic emulsion as defined in claim 11 which comprises fogged silver halide grains, at least 95%, by weight, of said grains having a size which is within about 40% of the average grain size.

19. A fogged direct positive emulsion containing a cyanine dye selected from the group consisting of 6-[(1,3-diethylimidazo[4,5-b]quinoxolin-2(3H)ylidene)ethylidene]-5-methyl-s-triazolo[1,5-a]pyrimidin-7(6H)-one, 5-methyl-6-[(1,3,3-trimethyl-5-nitro-2(3H)indolinylidene)ethylidene]-s-triazolo[1,5-a]pyrimidin-7(6H)-one, 6-[(3-ethyl-6-nitro-2-benzothiazolinylidene)ethylidene]-5-methyl-s-triazolo[1,5-a]pyrimidin-7(6H)-one, 5-methyl-6-[(1,3,3-trimethyl-1(H)-pyrrolo[2,3-b]pyridin-2-(3H)ylidene)ethylidene]-s-triazolo[1,5-a]pyrimidin-7(6H)-one, 6-[(3-ethyl-6-nitro-2-benzothiazolinylidene)ethylidene]-5-methyltetrazolo[1,5-a]pyrimidin-7-(6H)-one, 6-[(6-chloro-1,3-diphenylimidazo[4,5-b]quinoxolin-2(3H)-ylidene)ethylidene]-5-methyltetrazolo[1,5-a]pyrimidin-7(6H)-one, 6-[(6-chloro-1,3-diphenylimidazo[4,5-b]quinoxolin-2-(3H)ylidene)ethylidene]-5-methyl-s-triazolo[1,5-a]pyrimidin-7(6H)-one, 6-[(1-ethylnaphtho[1,2-d]thiazolin-2-ylidene)ethylidene]-5-methyl-s-triazolo[1,5-a]pyrimidin-7(6H)-one, 6-[(1,3-diethylimidazo[4,5-b]quinoxolin-2(3H)ylidene)ethylidene]-5-methyltetrazolo[1,5-a]pyrimidin-7(6H)-one, 5-methyl-6-[1,3,3-trimethyl-5-nitro-2(3H)-indolinylidene)ethylidene]tetrazolo[1,5-a]pyrimidin-7(6H)-one, 5-methyl-6[(1,3,3-trimethyl-1H-pyrrolo[2,3-b]pyridin-2(3H)ylidene)ethylidene]tetrazolo[1,5-a]pyrimidin-7(6H)-one.

20. A photographic element comprising a support having thereon at least one layer containing a direct positive emulsion of claim 3.

21. A photographic element comprising a support having thereon at least one layer containing a direct positive emulsion of claim 11.

22. A photographic element comprising a support having thereon at least one layer containing a direct positive emulsion of claim 19.

23. A photographic silver halide emulsion containing a cyanine dye selected from the group consisting of 6-[(1,3-diallylimidazo[4,5-b]quinoxalin-2(3H)-ylidene)ethylidene]-5-methyl-s-triazolo[1,5-a]pyrimidin-7(6H)-one, 5-methyl-6-[(1,3,3-trimethyl-5-nitro-2(3H)-indolinylidene)ethylidene]-s-triazolo[1,5-a]pyrimidin-7(6H)-one, 6-[(3-ethyl-6-nitro-2-benzothiazolinylidene)ethylidene]-5-methyl-s-triazolo[1,5-a]pyrimidin-7(6H)-one, 5-methyl-6-[(1,3,3-trimethyl-1(H)-pyrrolo[2,3-b]pyridin-2-(3H)ylidene)ethylidene]-s-triazolo[1,5-a]pyrimidin-7(6H)-one, 6-[(3-ethyl-6-nitro-2-benzothiazolinylidene)ethylidene]-5-methyltetrazolo[1,5-a]pyrimidin-7(6H)-one, 6-[(6-chloro-1,3-diphenylimidazo[4,5-b]quinoxolin-2(3H)ylidene)ethylidene]-5-methyltetrazolo[1,5-a]pyrimidin-7(6H)-one, 6-[(1-ethylnaphtho[1,2-d]thiazolin-2-ylidene)ethylidene]-5-methyl-s-triazolo[1,5-a]pyrimidin-7(6H)-one, 6-[(1,3-diethylimidazo[4,5-b]quinoxolin-2(3H)ylidene)ethylidene]-5-methyltetrazolo[1,5-a]pyrimidin-7(6H)-one, 5-methyl-6-[(1,3,3-trimethyl-5-nitro-2(3H)-indolinylidene)ethylidene]tetrazolo[1,5-a]pyrimidin-7(6H)-one, 5-methyl-6[(1,3,3-trimethyl-1H-pyrrolo[2,3-b]pyridin-2(3H)ylidene)ethylidene]tetrazolo[1,5-a]pyrimidin-7(6H)-one.

References Cited
UNITED STATES PATENTS 2,464,780  3/1949  Anish _____ 96—106X NORMAN G. TORCHIN, Primary Examiner R. E. FICHTER, Assistant Examiner U.S. Cl. X.R.

96—102,107; 260—240.4